Patented July 3, 1951

2,558,716

UNITED STATES PATENT OFFICE 2,558,716

THIOPHENE PREPARATION FROM HYDROCARBONS, ALCOHOLS, OR MONO-HALO HYDROCARBONS AND SULFUR DIOXIDE

Lawrence W. Devaney, Waco, Tex., John T. Clarke, Columbus, Ohio, and Charles H. Culnane, Beacon, N. Y., assignors to The Texas Company, New York, N. Y., a corporation of Delaware No Drawing. Application November 19, 1948, Serial No. 61,116

7 Claims. (Cl. 260—332.8)

This invention relates to an improved process for the preparation of heterocyclic sulfur compounds and particularly to an improved process for the production of thiophene and compounds containing a thiophene nucleus.

Heterocyclic sulfur compounds such as those containing a thiophene nucleus have, in the past, been primarily of academic interest due to the uneconomical and difficult methods used in the preparation thereof. Recent developments, however, have shown that thiophene and its homologs may be synthesized by methods which involve the use of economical charge stocks and are easily adaptable to commercial operation. These two commercially feasible methods comprise the catalytic reaction of sulfur dioxide with aliphatic hydrocarbons and the catalytic reaction of hydrogen sulfide with aliphatic hydrocarbons. These reactions are conducted in the vapor phase and in the presence of a surface-active type of catalyst. The subject invention presents a method whereby economies may be effected in the commercial adaptation of the two aforementioned processes by keeping a catalyst on-stream for a longer period of time at a reasonable level of thiophene production.

The improved process of this invention involves reacting an organic compound containing an aliphatic chain of at least two carbon atoms with hydrogen sulfide in the presence of a solid particulate surface-active material until the activity of the catalyst has fallen below a predetermined level and thereafter reacting an organic compound containing an aliphatic chain of at least two carbon atoms with sulfur dioxide over the same particulate surface-active catalyst until the activity of the catalyst has once again fallen below a predetermined level. Thereafter, the catalyst is regenerated and reused for the production of thiophene compounds in the aforedescribed cycle, namely, first, by the reaction of an organic compound with $H_2S$ and immediately thereafter by the reaction of an organic compound with $SO_2$. A volatile thermally labile sulfide may be used in place of or in addition to hydrogen sulfide in the initial conversion step. The method of the invention is predicated on the discovery that a spent catalyst from the production of thiophene compounds by conversion of organic compounds with $H_2S$ has an exceptionally high degree of activity for the production of thiophene compounds by reaction of sulfur dioxide with organic compounds.

The most important advantage of this invention is that the on-stream period of a particular catalyst is prolonged for a substantial period. In general, the method of this invention results in an approximate two-fold increase in the catalyst on-stream time. Another important advantage results from the fact that a catalyst which has been used in thiophene production by the $H_2S$ process effects a higher degree of conversion in the $SO_2$ process than does a fresh catalyst. The increase in catalyst on-stream time and the concomitant enhancement of the catalyst activity in the $SO_2$ process by prior use of the catalyst in the $H_2S$ process effect substantial economies in the production of thiophene compounds particularly at a commercial level.

The process of the invention is especially applicable to the production of thiophene itself or to thiophene compounds possessing acyclic substituents. The type of thiophene compounds produced by the reaction process is dependent to a large extent on the choice of charge stock used in the reaction. To produce either thiophene or a thiophene derivative containing an acyclic constituent, the charge material is preferably a saturated or unsaturated acyclic hydrocarbon having at least two aliphatic carbon atoms in a chain or a mixture of organic compounds containing a substantial proportion of hydrocarbons of this type. Low molecular weight aliphatic hydrocarbons, such as are produced from the processing of petroleum or natural gas, constitute suitable charge stocks for the preparation of thiophene and lower acyclic homologs. When acyclic hydrocarbons containing more than 4 carbon atoms are used in the reaction, acyclic homologs of thiophene, containing one or more side chains, are the predominant product. There appears to be no upper limit on the chain length of the hydrocarbons employed for the charge stock with the exception that the hydrocarbons should be in the vapor form under the reaction conditions. When relatively simple reaction products are desired, however, it is advisable to employ a charge stock containing predominant amounts of hydrocarbons containing from 4 to 10 carbon atoms.

The process also includes the use of compounds other than acyclic hydrocarbons as the charge stock. There may be employed substituted acyclic hydrocarbons containing at least two aliphatic carbon atoms in a chain in which the substituents either remain attached to the acyclic hydrocarbon during the reaction, or are removed during the reaction to form compounds which do not have a substantially adverse effect on the reaction. Examples of such substituted acyclic hydrocarbons are halogenated aliphatic hydrocarbons such as chlorobutane and saturated or unsaturated aliphatic alcohols having at least two carbon atoms in the chain such as butyl alcohol. There may also be employed as a charge stock cyclic compounds in which there is attached to the cyclic nucleus an acyclic aliphatic side chain containing at least two carbon atoms. Aryl-substituted acyclic hydrocarbons such as ethyl, propyl or butyl benzene or corresponding derivatives of naphthalene constitute examples of this class of compounds which can be used as the charge stock to produce thiophene derivatives. Cycloaliphatic compounds such as cyclopropane and cyclobutane in which the cyclic nucleus is unstable at elevated temperatures may also be used as the charge stock.

It is feasible to substitute in whole or in part a volatile thermally labile sulfide for $H_2S$ in the initial stage of the conversion cycle. It is preferred, of course, to use hydrogen sulfide but it may be replaced by other sulfides which are volatile and thermally labile under the conditions of reaction including organic and inorganic sulfides, hydrosulfides and polysulfides which are decomposed to hydrogen sulfide and/or sulfur under reaction conditions. Metal sulfides are excluded from the inorganic sulfides which may be used since they decompose to non-volatile metallic constituents which tend to deposit on the catalytic surfaces and destroy catalyst activity. Thus only the non-metal and metalloid inorganic sulfides are included within the scope of inorganic volatile thermally labile sulfides; examples of such are ammonium sulfide, ammonium hydrosulfide and ammonium polysulfide. Useful volatile thermally labile organic sulfides include the aliphatic mercaptans and sulfides, particularly those containing a tertiary carbon atom; ethyl mercaptan, ethyl sulfide, tertiary butyl mercaptan and tertiary butyl sulfide illustrate the organic members of this class.

In the second stage of the conversion cycle, sulfur dioxide is employed to effect conversion of organic compounds containing an aliphatic chain of at least two carbon atoms to thiophene compounds. Sulfur dioxide may be employed in the form of its hydrate which decomposes at reaction temperature to yield a charge mixture comprising sulfur dioxide, hydrocarbon and steam, which latter serves as a diluent in the mixture.

The heterocyclization reaction of the invention is conducted in the presence of a solid particulate surface-active catalyst which may be described chemically as a solid contact material of the class of oxides and sulfides which are stable under the conditions of reaction. Such catalysts include metal oxides such as molybdena which, under the conditions of reaction, may undergo conversion to the corresponding sulfide. It is recognized that certain of the materials classified as catalysts for the subject reaction are relatively inert catalytically as applied to conventional hydrocarbon conversion reactions. Selection of the particular catalyst to be used would depend to a large extent upon the choice of charge stock used in the reaction. The solid contact catalysts usually preferred for general application with a majority of economical charge stocks are the solid, acid-reacting catalysts such as amphoteric metal oxides and sulfides which are stable under reaction conditions, silica, etc.

Specific examples of the catalysts contemplated for use in the invention are oxides of aluminum, chromium, vanadium, molybdenum, titanium, magnesium, boron and silicon, and sulfides of nickel, tungsten, cobalt, iron, tin, etc., as well as mixtures of chemical combinations thereof such as silica-alumina, acid-treated bentonitic clays, etc.

The familiar class of dehydrogenation catalysts are included within the general classification of solid acid-reacting contact catalysts and are preferred catalysts for the process of this invention. Suitable dehydrogenation catalysts are the oxides and stable sulfides of the metals of Group VI of the Periodic Table. Specially preferred dehydrogenation catalysts are chromia-alumina, silica-chromia-alumina, molybdena-alumina and molybdenum sulfide-alumina catalysts.

In carrying out the process of the invention, the reactants in vapor form are introduced into a reaction chamber containing a solid contact catalyst maintained at the desired reaction temperature. The catalytic reaction zone may either be a fixed bed type or a fluid type in which latter type operation the catalyst is maintained in powder form in a turbulent state.

It is evident the process may be operated in accordance with any of the usual techniques for high temperature catalytic conversions. Thus, fixed catalyst beds may be used in alternate reaction and regeneration cycles; fluid catalyst operation may be used wherein catalyst is continuously withdrawn from the catalyst zone, regenerated and reintroduced into the catalyst zone after regeneration; fluidized fixed bed operation may also be used in which the catalyst particles remain in the reaction zone during alternate reaction and regeneration cycles; stirred catalyst beds, as well as moving catalyst beds of the Thermofor type, are other possible alternatives.

It will be recognized that the conditions of reaction will vary somewhat between the initial stage of thiophene production employing hydrogen sulfide and the second stage employing $SO_2$ as the sulfur-donating heterocyclization agent. Moreover, it will be further understood that the conditions of reaction will vary in each of the aforementioned stages, depending upon the particular reactants and catalysts employed, as well as with the type of process technique utilized. However, temperatures of at least 700° F. are required both for the $H_2S$ stage and for the $SO_2$ stage. Ordinarily temperatures below 1500° F. will be employed. Moreover, temperatures between 950 and 1250° F. are preferred in both stages. The other operating variables will be treated separately for the $H_2S$ stage and for the $SO_2$ stage.

For the conversion of hydrocarbons to thiophene compounds by reaction with $H_2S$, the operating variables should be maintained within the following broad ranges: a space velocity of about 0.1 to 10.0 wherein space velocity defines the weight of hydrocarbon per hour per weight of catalyst and a mol ratio of $H_2S$ to hydrocarbon within the range of 0.1 to 10.0 are preferred in the majority of reactions. The particular conditions of reaction are best illustrated by reference to conditions involved in the reaction of an unsaturated acyclic hydrocarbon, such as butylene-2, over chromia-alumina catalyst employing a fluidized fixed bed type of process technique. When charging butylene-2 over a chromia-alumina catalyst, the space velocity advantageously falls within the range of 0.5 to 5.0; the mol ratio of $H_2S$ to butylene-2 preferably lies within the range of 1.0 to 4.0.

For the production of thiophene compounds by the reaction of organic compounds with sulfur dioxide, the space velocity in general should be maintained within the range of 0.3 to 10 with higher space velocities being employed with higher molecular weight charge materials and at higher temperatures; the mol ratio of sulfur dioxide to charge material should be at least 0.3 and preferably at least 0.5 for saturated charge stocks with mol ratios between 1 and 3 being preferred for the majority of charge compounds. The particular conditions of reaction for the $SO_2$ stage are best illustrated by reference to conditions employed for the conversion of normal butane over a chromia-alumina catalyst that was previously employed for the production of thiophene compounds by the $H_2S$ process, as described in the previous paragraph. The space velocity should be maintained between 0.3 and 4 and preferably should fall between 0.5 and 1.5; the mol ratio of sulfur dioxide to butane should be at least 0.5 and preferably 1.0 to 2.5.

It will be understood that the conditions described as optimum for the two stages are those which result in maximum production of thiophene in a once-through process with catalyst maintained in a fluidized fixed bed. When the hydrocarbon products are recycled, it may be desirable to maintain other conditions during the reaction.

The process period for the production of thiophene compounds in the initial stage by the reaction of organic compounds containing an aliphatic chain of at least two carbon atoms with hydrogen sulfide is usually of about one hour duration. The process period for optimum thiophene production depends to some extent upon the charge stock and the reaction conditions employed. Periodic determination of thiophene yields will indicate a practical period of using the $H_2S$ process before switching to the $SO_2$ process. When the thiophene yields are found to fall off to a value less than 40 per cent of their initial activity, a switch is made to the $SO_2$ process.

The permissible on-stream period for optimum thiophene production with the $SO_2$ process in the second stage also depends upon the particular catalyst utilized and on the charge stock and reaction conditions, but is ordinarily of longer duration than 1.5 hours. In any case, periodic determination of thiophene yields will indicate the practical period for using the $SO_2$ process without reactivation. When employing a $H_2S$ process-spent chromia-alumina catalyst, the practical period of catalyst life in the $SO_2$ stage usually is of the order of 2 to 4 hours, after which the thiophene yields fall off sharply.

Thiophene compounds produced by the reaction may be recovered from the reaction products in accordance with conventional methods of recovery. For example, the reaction products containing unreacted charge stocks, sulfur, cracked products of the charge stock, diolefinic compounds, unreacted sulfur dioxide and hydrogen sulfide may be passed through a caustic soda solution to dissolve the acid gases. If the caustic soda solution is maintained cold, the thiophene will condense as a supernatant layer. The thiophene layer can be drawn off therefrom and distilled. If the caustic soda solution is maintained hot, the thiophene compounds will steam distill from the caustic solution and can then be separated from the water layer and purified by distillation.

The thiophene compounds may also be recovered in crude form by a simple condensation procedure which involves passing the products into a cool body of hydrocarbon oil, such as kerosene, in which the thiophene compounds will condense; thiophene compounds can later be recovered from the condensing oil by distillation.

The process of the invention may be further illustrated by the following specific examples. In Example I, there is exemplified the conversion of butane to thiophene employing the $SO_2$ process with a fresh chromia-alumina catalyst. In Example II, there is illustrated the process of the subject invention wherein the catalyst is used for effecting conversion of hydrocarbon to thiophene employing the $SO_2$ process after it has been used in the $H_2S$ process.

*Example I*

Butane and sulfur dioxide in a mol ratio of about 1.9 mols of sulfur dioxide per mol of butane were mixed, pre-heated to approximately reaction temperature and charged to a catalytic reaction chamber maintained at about 1100° F. and atmospheric pressure. The catalytic reaction chamber was a vertical reaction zone wherein 500 grams of 100 to 200 mesh catalyst were maintained in a fluidized state by passage of the reactants therethrough. The catalyst consisted of a mixture of chromic oxide and alumina and had the approximate composition of 10 per cent $Cr_2O_3$ and 90 per cent $Al_2O_3$ by weight. The reactants were charged at a liquid hydrocarbon space velocity of approximately 0.8 weight of butane per hour per weight of catalyst. The catalyst was maintained on stream for a period of about 160 minutes without reactivation. Crude thiophene of about 95 per cent purity was obtained in a yield of about 38.8 pounds of thiophene per 100 pounds of butane charged for this 160 minute period.

*Example II*

Butylene-2 and hydrogen sulfide in a mol ratio of 1.9 mols of hydrogen sulfide per mol of butylene-2 were mixed, preheated to approximately reaction temperature and charged to a catalytic reaction chamber maintained at about 1100° F. and atmospheric pressure. The reaction chamber was a vertical reaction zone wherein 500 grams of 100 to 200 mesh catalyst were maintained in a fluidized state by passage of the reactants therethrough. The catalyst consisted of a mixture of chromic oxide and alumina and had the approximate composition of 10 per cent $Cr_2O_3$ and 90 per cent $Al_2O_3$ by weight. The reactants were charged at a liquid hydrocarbon space velocity of approximately 0.8 weight of butylene-2 per hour per weight of catalyst. The catalyst was maintained on stream for a period of about 80 minutes. At the end of this time, crude thiophene of about 95 per cent purity was obtained in a yield of about 45.4 pounds of thiophene per 100 pounds of butylene-2 charged.

Immediately after discontinuing the introduction of butylene-2 and hydrogen sulfide into the reaction zone, normal butane and sulfur dioxide in a mol ratio of about 1.9 mols of sulfur dioxide per mol of butane were introduced into the reaction chamber after having been mixed and preheated to approximately reaction temperature. During the contacting of butane and sulfur dioxide with the chromia-alumina catalyst which had been used for the production of thiophene via the $H_2S$ process, the reaction temperature was also 1100° F. and the catalyst was maintained in a fluidized state by passage of the reactants therethrough. The butane and $SO_2$ were charged at a liquid hydrocarbon space velocity of approximately 0.8 weight of butane per hour per weight of catalyst. The catalyst was maintained on stream for a period of about 160 minutes without reactivation. Crude thiophene of about 95 per cent purity was obtained in a yield of about 42.6 pounds of thiophene per 100 pounds of butane charged during this 180-minute period.

The preceding examples illustrate the advantages of this invention. It will be noticed that a high yield of thiophene is obtained even after the catalyst has been on stream for a total of 240 minutes. The second important advantage is seen in the fact that prior use of the catalyst for the production of thiophene using the $H_2S$ process enhances the efficiency of the catalyst for the $SO_2$ process; in Example II, 42.6 pounds of thiophene per 100 pounds of butane charged were obtained employing a chromia-alumina catalyst which had previously been used in the $H_2S$ process while only 38.8 pounds of thiophene per 100 pounds of butane charged were obtained with a fresh chromia-alumina catalyst in Example I.

It will be understood, of course, that these examples are merely illustrative of the preferred embodiment of the invention and other charge stocks or conditions of reaction may be employed in accordance with the previous description. By using other selective hydrocarbon charge stocks, thiophene compounds containing various constituents may be produced by the present process. Thionaphthene and derivatives thereof may be produced by the reaction of compounds such as ethylbenzene and styrene, with hydrogen sulfide and sulfur dioxide in accordance with the method of this invention. Other organic compounds containing an acyclic aliphatic chain of two or more carbon atoms may be employed to produce a variety of compounds containing a thiophene nucleus.

Obviously many modifications and variations of the invention, as hereinbefore set forth, may be made without departing from the spirit and scope thereof and, therefore, only such limitations should be imposed as are indicated in the appended claims.

We claim:

1. A process for producing thiophene compounds which comprises reacting an organic compound selected from the group consisting of hydrocarbons, alcohols and mono-halo hydrocarbons containing an aliphatic chain of at least two carbon atoms with hydrogen sulfide in the vapor phase at an elevated temperature of at least 700° F. over a solid particulate surface-active catalyst, continuing said reaction until the catalyst activity has been substantially reduced and thereafter employing said catalyst for the production of thiophene compounds by the reaction of sulfur dioxide with a hydrocarbon containing an aliphatic chain of at least two carbon atoms in the vapor phase at an elevated temperature of at least 700° F.

2. A process according to claim 1 in which the organic compound reacted with hydrogen sulfide is an aliphatic hydrocarbon containing at least two carbon atoms.

3. A process according to claim 1 in which the solid particulate surface-active catalyst is a dehydrogenation catalyst.

4. A process according to claim 1 in which the solid particulate surface-active catalyst comprises a surface-active material and a compound selected from the group consisting of group VI metal oxides and sulfides.

5. A process according to claim 1 in which an organic compound is reacted with hydrogen sulfide over a catalyst until the catalyst activity has fallen below 40 per cent of the initial activity.

6. A process for producing thiophene compounds which comprises reacting a hydrocarbon containing an aliphatic chain of at least two carbon atoms with hydrogen sulfide in the vapor phase at a temperature of at least 700° F. over a solid particulate surface-active catalyst, continuing said reaction until the catalyst activity has fallen below 40 per cent of the initial activity, employing said used catalyst for the production of thiophene compounds by the reaction of sulfur dioxide with a hydrocarbon containing an aliphatic chain of at least two carbon atoms in the vapor phase at a temperature of at least 700° F., regenerating said catalyst and reusing said catalyst for the production of thiophene compounds by the reaction of a hydrocarbon containing an aliphatic chain of at least two carbon atoms successively with hydrogen sulfide and with sulfur dioxide.

7. In a process for synthesis of thiophene by reaction of an organic compound with hydrogen sulfide and sulphur dioxide in successive operations, the steps comprising reacting a hydrocarbon containing an aliphatic chain of at least two carbon atoms with hydrogen sulfide in the vapor phase at an elevated temperature of at least 700° F. in the presence of a solid particulate surface active catalyst, said reaction being accompanied by reduction in activity of said catalyst for the production of thiophene compounds by the reactions of hydrocarbons with $H_2S$, and subsequently reacting hydrocarbon containing an aliphatic chain of at least two carbon atoms with sulphur dioxide in the presence of said catalyst of reduced activity for the $H_2S$ reaction.

LAWRENCE W. DEVANEY.
JOHN T. CLARKE.
CHARLES H. CULNANE.

REFERENCES CITED

The following references are of record in the file of this patent:

UNITED STATES PATENTS

| Number | Name | Date |
| --- | --- | --- |
| 2,468,904 | Wagner | May 3, 1949 |